US012602580B2

(12) United States Patent
Choudhury et al.

(10) Patent No.: US 12,602,580 B2
(45) Date of Patent: Apr. 14, 2026

(54) DATASET DEPENDENT LOW RANK DECOMPOSITION OF NEURAL NETWORKS

(71) Applicant: International Business Machines Corporation, Armonk, NY (US)

(72) Inventors: Anamitra R. Choudhury, Vasant Kunj (IN); Saurabh Goyal, New Delhi (IN); Vivek Sharma, Bangalore (IN); Venkatesan T. Chakaravarthy, Munirka (IN); Yogish Sabharwal, Gurgaon (IN); Ashish Verma, Nanuet, NY (US)

(73) Assignee: International Business Machines Corporation, Armonk, NY (US)

( * ) Notice: Subject to any disclaimer, the term of this patent is extended or adjusted under 35 U.S.C. 154(b) by 1253 days.

(21) Appl. No.: 16/453,380

(22) Filed: Jun. 26, 2019

(65) Prior Publication Data

US 2020/0410336 A1     Dec. 31, 2020

(51) Int. Cl.
| *G06N 3/08* | (2023.01) |
| *G06N 3/082* | (2023.01) |
| *G06N 20/00* | (2019.01) |

(52) U.S. Cl.
CPC ............... *G06N 3/08* (2013.01); *G06N 3/082* (2013.01); *G06N 20/00* (2019.01)

(58) Field of Classification Search
CPC .......... G06N 3/08; G06N 3/082; G06N 20/00; G06N 3/045
See application file for complete search history.

(56) References Cited

U.S. PATENT DOCUMENTS

| 5,764,858 | A | 6/1998 | Sheu et al. |
| 11,720,786 | B2 | 8/2023 | Tate et al. |
| 2016/0217369 | A1 | 7/2016 | Annapureddy et al. |

(Continued)

FOREIGN PATENT DOCUMENTS

| CN | 109359726 | 2/2019 |
| CN | 109858611 | 6/2019 |

(Continued)

OTHER PUBLICATIONS

Molchanov, Pavlo, et al. "Pruning convolutional neural networks for resource efficient inference." arXiv preprint arXiv:1611.06440 (2016). (Year: 2016).*

(Continued)

*Primary Examiner* — Sehwan Kim
(74) *Attorney, Agent, or Firm* — Ryan, Mason & Lewis, LLP

(57)     ABSTRACT

Methods, systems, and computer program products for dataset dependent low rank decomposition of neural networks are provided herein. A computer-implemented method includes obtaining a target dataset and a trained model of a neural network; providing at least a portion of the target dataset to the trained model; determining relevance of each of one or more of filters of the neural network and channels of the neural network to the target dataset based on the provided portion, wherein the one or more of the filters and the channels correspond to at least one layer of the neural network; and compressing the trained model of the neural network based at least in part on the determined relevancies.

20 Claims, 9 Drawing Sheets

(56) References Cited

U.S. PATENT DOCUMENTS

| | | | | |
|---|---|---|---|---|
| 2017/0154262 | A1 | 6/2017 | Sussillo et al. | |
| 2019/0087729 | A1* | 3/2019 | Byun | G06N 3/045 |
| 2019/0347847 | A1* | 11/2019 | Elgharib | G06T 15/205 |
| 2020/0234129 | A1* | 7/2020 | Fagerholm | G06N 3/045 |
| 2020/0257983 | A1* | 8/2020 | Tachibana | G06F 18/217 |
| 2020/0311552 | A1* | 10/2020 | A | G06N 3/10 |
| 2021/0374474 | A1* | 12/2021 | Shen | G06F 18/214 |

FOREIGN PATENT DOCUMENTS

| | | | |
|---|---|---|---|
| CN | 109886397 | | 6/2019 |
| CN | 113826120 | A | 12/2021 |
| DE | 112020001774 | T5 | 12/2021 |
| GB | 2600055 | A | 4/2022 |
| JP | 201855260 | | 10/2019 |
| JP | 2022537738 | A | 8/2022 |
| WO | 2020260991 | A1 | 12/2020 |

OTHER PUBLICATIONS

Kim, Yong-Deok, et al. "Compression of deep convolutional neural networks for fast and low power mobile applications." arXiv preprint arXiv:1511.06530 (2015). (Year: 2015).*

Xiao, Houping, et al. "eOTD: An efficient online tucker decomposition for higher order tensors." 2018 IEEE International Conference on Data Mining (ICDM). IEEE, 2018. (Year: 2018).*

Figurnov, Mikhail, et al. "Perforatedcnns: Acceleration through elimination of redundant convolutions." Advances in neural information processing systems 29 (2016). (Year: 2016).*

Lin, Wei-Shiang, Hao-Ning Wu, and Chih-Tsun Huang. "Accelerating Convolutional Neural Networks using Iterative Two-Pass Decomposition." (2018). (Year: 2018).*

Rabanser, Stephan, Oleksandr Shchur, and Stephan Günnemann. "Introduction to tensor decompositions and their applications in machine learning." arXiv preprint arXiv:1711.10781 (2017). (Year: 2017).*

Malik, Osman Asif, and Stephen Becker. "Low-rank tucker decomposition of large tensors using tensorsketch." Advances in neural information processing systems 31 (2018). (Year: 2018).*

Astrid, Marcella, and Seung-Ik Lee. "Cp-decomposition with tensor power method for convolutional neural networks compression." 2017 IEEE International Conference on Big Data and Smart Computing (BigComp). IEEE, 2017. (Year: 2017).*

Yu, Xiyu, et al. "On compressing deep models by low rank and sparse decomposition." Proceedings of the IEEE conference on computer vision and pattern recognition. 2017. (Year: 2017).*

Hu, Y., et al. "A novel channel pruning method for deep neural network compression. arXiv 2018." arXiv preprint arXiv:1805.11394. (Year: 2018).*

Yao, Heming, et al. "Filter-pruned 3D convolutional neural network for drowsiness detection." 2018 40th Annual International Conference of the IEEE Engineering in Medicine and Biology Society (EMBC). IEEE, 2018. (Year: 2018).*

International Search Report and Written Opinion from International Application No. PCT/IB2020/055191, 10 pages, mailed Sep. 16, 2020.

Babaeizadeh et al., NoiseOut: A Simple Way to Prune Neural Networks, arXiv:1611.06211v1 [cs.NE], Nov. 18, 2016, arxiv.org.

Chen et al., Compressing Convolutional Neural Networks in the Frequency Domain, Proceedings of the 22nd ACM SIGKDD International Conference on Knowledge Discovery and Data Mining, Aug. 13-17, 2016, San Francisco, California, USA.

Thieu, T. N. et al., Tensor Completion Based on Tucker Factorization for Missing Value Imputation. International Journal of Bioscience, Biochemistry and Bioinformatics, Apr. 2, 2016, 6(2), 34.

Filipovic, M., & Jukic, A., Tucker factorization with missing data with application to low n-rank tensor completion. Multidimensional systems and signal processing, 2015, 26(3), 677-692.

Li, Y., Liang, Y., & Risteski, A., Recovery guarantee of weighted low-rank approximation via alternating minimization. In International Conference on Machine Learning 2016 (pp. 2358-2367).

Srebro et al., Weighted low-rank approximations, In Proceedings of the 20th International Conference on Machine Learning (ICML-03) 2003 (pp. 720-727).

Razenshteyn, I., Song, Z., & Woodruff, D. P. , Weighted low rank approximations with provable guarantees. In Proceedings of the forty-eighth annual ACM symposium on Theory of Computing (pp. 250-263). 2016, ACM.

Denton, E. L., Zaremba, W., Bruna, J., Lecun, Y., & Fergus, R. , Exploiting linear structure within convolutional networks for efficient evaluation, In Advances in neural information processing systems 2014 (pp. 1269-1277).

Ioannou et al., Training cnns with low-rank filters for efficient image classification. arXiv preprint arXiv:1511.06744. Nov. 20, 2015.

Jaderberg, M., Vedaldi, A., & Zisserman, A., Speeding up convolutional neural networks with low rank expansions. arXiv preprint arXiv:1405.3866. May 15, 2014.

Lebedev, V., Ganin, Y., Rakhuba, M., Oseledets, I., & Lempitsky, V. (2014). Speeding-up convolutional neural networks using fine-tuned cp-decomposition. arXiv preprint arXiv:1412.6553. Dec. 19, 2014.

Kim et al., Compression of deep convolutional neural networks for fast and low power mobile applications. arXiv preprint arXiv:1511.06530. Nov. 20, 2015.

Srinivas et al. Data-free parameter pruning for deep neural networks. arXiv preprint arXiv:1507.06149. Jul. 22, 2015.

Roychowdhury et al., Reducing duplicate filters in deep neural networks, In NIPS workshop on Deep Learning: Bridging Theory and Practice, vol. 1. 2017.

Yamamoto et al., Model Pruning Technology for Deep Neural Networks, OKI Technical Review 233, vol. 86, No. 1, Oki Electric Industry Co., Ltd., May 20, 2019, pp. 24-27.

Japanese Patent Office, "Notice of Allowance", Nov. 21, 2023, 5 pages, Application No. JP 2021-575204.

UK Intellectual Property Office, "Examination Report", May 9, 2022, 8 pages, GB Application No. 2200558.1.

* cited by examiner

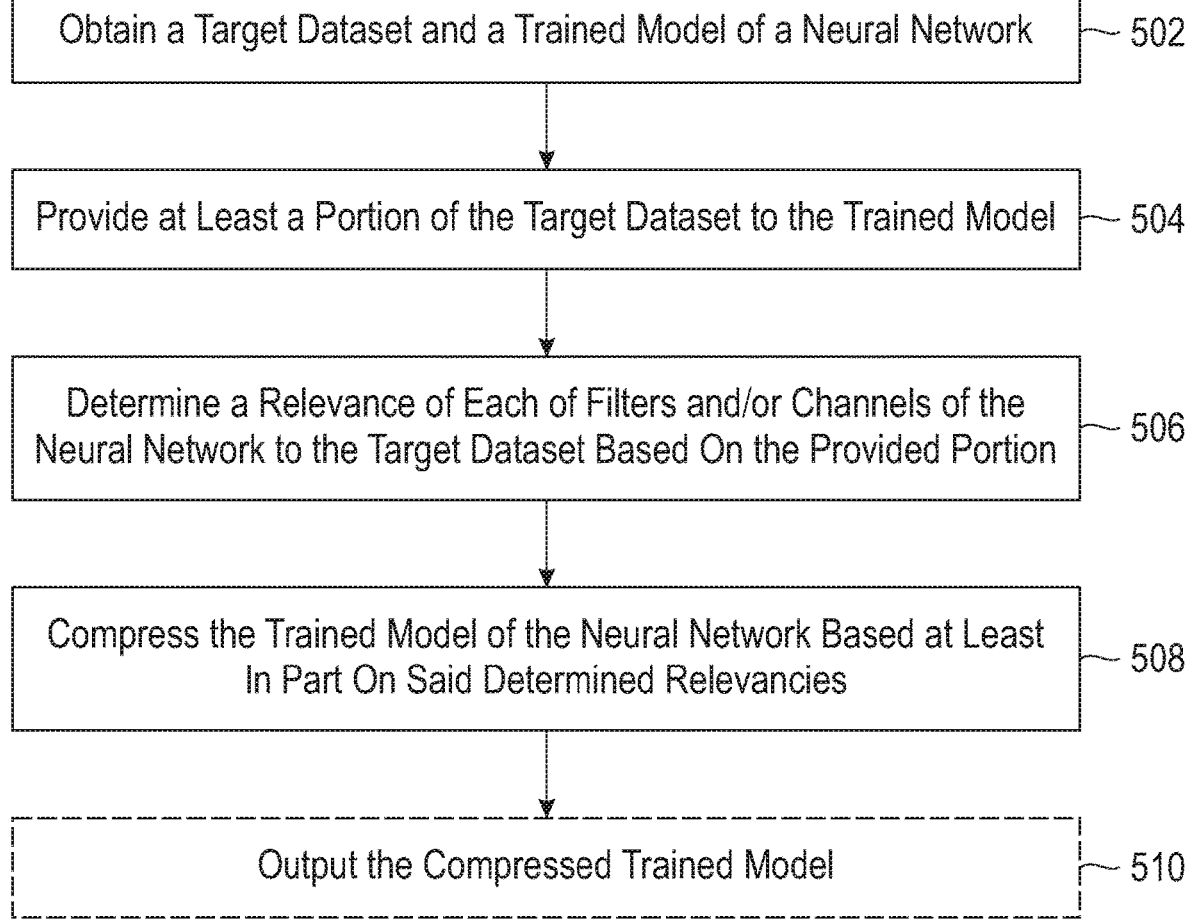

Obtain a Target Dataset and a Trained Model of a Neural Network ~ 502

Provide at Least a Portion of the Target Dataset to the Trained Model ~ 504

Determine a Relevance of Each of Filters and/or Channels of the Neural Network to the Target Dataset Based On the Provided Portion ~ 506

Compress the Trained Model of the Neural Network Based at Least In Part On Said Determined Relevancies ~ 508

Output the Compressed Trained Model ~ 510

FIG. 5

DATASET DEPENDENT LOW RANK DECOMPOSITION OF NEURAL NETWORKS

FIELD

The present application generally relates to information technology and, more particularly, to compression of neural network models.

BACKGROUND

Neural networks, such as deep neural networks, are used in a variety of artificial intelligence applications, such as computer vision, speech recognition and natural language processing, for example. The number of layers and parameters of a deep neural network increases with the size of datasets used with these models. For example, a deep neural network for image classification may include 16 layers and over 130 million parameters, resulting in a trained model that is over 500 megabytes. As such, deep neural networks often require a significant amount of computing resources making them particularly difficult to use on devices with limited resources, such as mobile phones and edge devices in the context of Internet of Things (TOT), for example.

SUMMARY

In one embodiment of the present invention, techniques for dataset dependent low rank decomposition of neural networks are provided. An exemplary computer-implemented method can include obtaining (i) a target dataset and (ii) a trained model of a neural network; providing at least a portion of the target dataset to the trained model; determining relevance of each of one or more of (i) filters of the neural network and (ii) channels of the neural network to the target dataset based on the provided portion, wherein the one or more of the filters and the channels correspond to at least one layer of the neural network; and compressing the trained model of the neural network based at least in part on the determined relevancies.

According to another embodiment of the subject matter described herein, a method is provided including obtaining a trained model of a convolutional neural network and a dataset on which the model was trained; analyzing the trained model to determine (i) inherent redundancies and (ii) relevancies of parts of one or more layers of the convolutional neural network and the dataset, at least in part by performing one or more epochs of training of the trained model on the dataset, wherein the parts of the one or more layers comprise at least one of (a) filters and (b) channels; and compressing the trained model based on the determined inherent redundancies and the relevancies.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 5 is a flow diagram illustrating techniques according to an embodiment of the invention;

DETAILED DESCRIPTION

Figure 1:
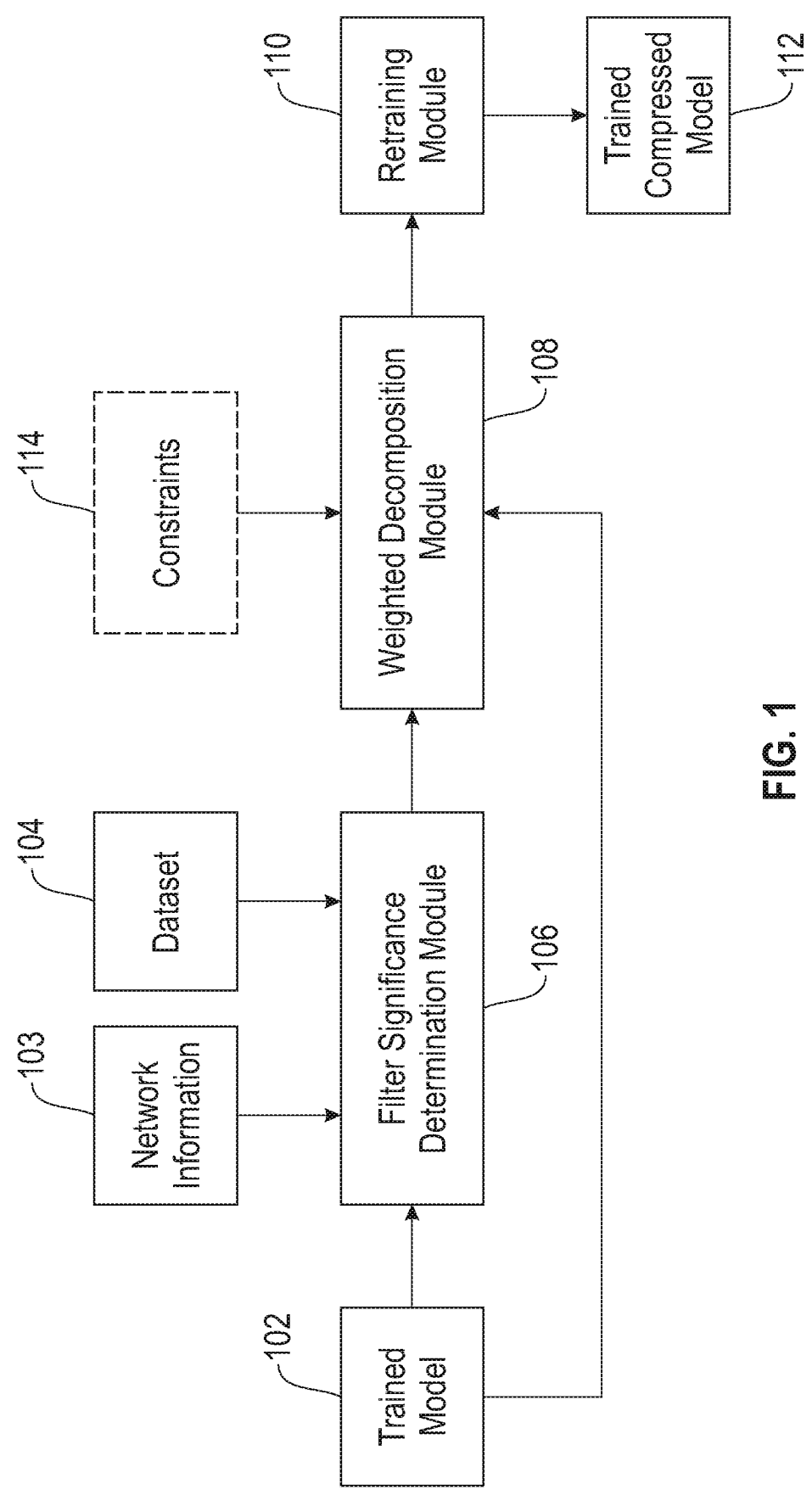
FIG. 1 is a diagram illustrating system architecture, according to an exemplary embodiment of the invention.

In general, a neural network is a model that includes a number of layers of simple connected units or neurons followed by nonlinearities, wherein at least one of the layers is a hidden layer. A hidden layer is a synthetic layer between the input layer (corresponding to input variables or features) and the output layer (corresponding to the model's output, e.g., a prediction or answer when provided with an input example). Deep neural networks refer to neural networks that include large number of hidden layers.

Neural networks include corresponding weights that describe how neurons relate to their respective inputs. By way of example, for an input tensor of all ones, a weight having a higher value (e.g., closer to 1) may indicate a neuron is more likely to 'fire', whereas a weight having a lower value (e.g., closer to 0) indicates the neuron is less likely to fire. For a given layer, the weights may be represented using a tensor (referred to herein as a 'weight tensor'). As a non-limiting example, a weight tensor may correspond to a matrix where each row in the matrix represents the weights connecting a neuron to its inputs.

A convolutional neural network refers to a neural network in which at least one of the layers is a convolutional layer. A convolutional layer is a layer in which a convolutional filter passes along an input tensor (e.g., an input tensor of dimension height×width×channel), wherein the convolutional filter is a tensor having the same rank (referred to herein as 'channel') as the input tensor, but a smaller shape. For example, filters for a 9×9 input matrix may include any 2D matrix smaller than 9×9 (such as a 3×3 matrix, for example).

As noted herein, deep neural networks often require significant computing resources, particularly as the number of layers and parameters increases. One way to reduce the amount of required computing resources is to compress the model using one or more compression mechanisms, which include, for example, pruning, weight sharing, encoding, and performing low rank decomposition of connection weights.

One example of a low rank decomposition scheme is Tucker decomposition. Tucker decomposition decomposes a tensor into a set of matrices and one small core tensor. For example, a Tucker decomposition of a 3D Tensor $X \in R^{I*J*K}$ is given by:

$$X_{i,j,s} = \sum_{r_1=1}^{R_1} \sum_{r_2=1}^{R_2} \sum_{r_3=1}^{R_3} G_{r_1,r_2,r_3} A_{i,r_1} B_{j,r_2} C_{s,r_3},$$

wherein G is the core matrix $\in R^{r_1*r_2*r_3}$ and $A \in R^{I*r_1}$, $B \in R^{J*r_2}$, $C \in R^{K*r_3}$ are factor matrices along each dimension of the 3D tensor. In this example, the Tucker decomposition results in a compression ratio equal to:

$$\frac{I \cdot J \cdot K}{I \cdot r_1 + J \cdot r_2 + K \cdot r_3}$$

A reconstructed tensor may be generated based on the core and factor matrices that essentially approximate the weight tensor of, e.g., a given layer of a neural network such that the reconstructed tensor has a smaller rank than the weight tensor, thereby reducing the required size and/or flops.

Existing compression mechanisms do not take into account how weight tensors (filters and channels) behave for a given dataset. For example, some filters (even with large weight entries) may fire less depending on the input dataset.

Accordingly, one or more example embodiments herein describe techniques for dataset dependent low rank decomposition of neural networks. At least one of the example embodiments described herein accounts for how weight tensors at each layer respond to a particular input dataset, and thus allow the rank of the reconstructed tensor to be even further reduced.

FIG. 1 is a diagram illustrating system architecture, according to an embodiment of the invention. By way of illustration, FIG. 1 depicts a filter significance determination module 106, a weighted decomposition module 108 and a retraining module 110. The filter significance determination module 106 obtains a dataset 104, a trained model 102, and network information 103 related to the trained model 102. The network information 103 may include, for example, information corresponding to different layers of the neural network, such as, for example, the number of filters and channels in each convolution layer. The filter significance determination module 106 performs one or more epochs of training (e.g., forward and backward pass) to determine how the filters and/or channels corresponding to some or all of the layers of the neural network respond to the input images. For example, filter significance determination module 106 may compute statistics corresponding to, for example, activation values, gradients and Taylor series. Filters and/or channels that fire less frequently are assigned a lower significance value.

Figures 2A, 2B:
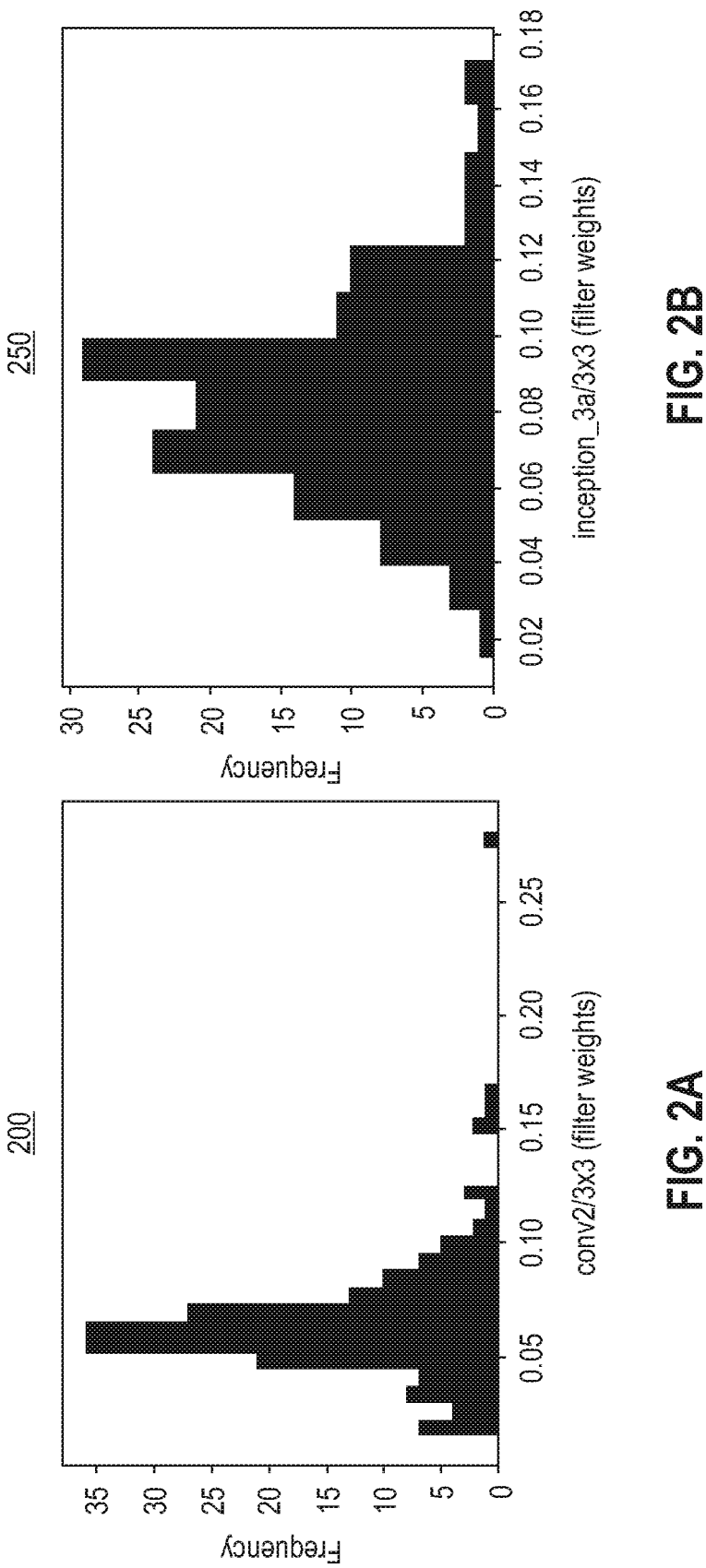
FIGS. 2A and 2B show graphs corresponding to filters at different layers of a trained neural network in accordance with one or more exemplary embodiments of the subject matter described herein.

Referring also to FIGS. 2A and 2B, these figures are graphs 200, 250 corresponding to the frequency of filter weight values for different layers of a trained neural network given a particular input dataset. In this example, the graphs 200, 250 are the result of a GoogLeNet model transfer learnt on the Bird200 dataset. Graph 200 corresponds to the convolutional layer conv2/3×3' of the GoogLeNet model and shows the frequency of different filter weights for the convolutional layer (i.e., conv2_3×3). It can be seen from graph 200 that the filter weights between, for example, 0.20 and 0.25 in the convolutional layer were not used for this dataset, and the most frequently used filter weights were between approximately 0.05 and 0.1. Graph 250 in FIG. 2B shows the frequency of different weights for another convolution layer (i.e., inception_3a/3×3) of the trained GoogLeNet model. For graph 250, the most frequently used filter weights for the inception layer were between 0.04 and 0.12, while the remaining filter weights were less used far less frequently. The filter significance determination module 106 may assign the significance of the filters/channels for a particular dataset based on one or more of a combination of the weight values of the filters/channels, output activations, and gradients corresponding to a filter/channel.

The weighted decomposition module 108 performs weighted tensor decomposition based on the significance assigned by the significance determination module 106. In some example embodiments, the weighted decomposition module 108 determines a target rank for the resulting tensor, which may be based on one or more constraints 114 (such as constraints provided by a user, for example). The user constraints 114 may correspond to, for example, processing requirements or memory requirements for the compressed trained model.

The weighted decomposition module 108 performs a factorization process to compress the trained model. The factorization process may include, for example, applying at least one of Tucker Decomposition and CP Decomposition. The retraining module 110 retrains the compressed model output by the weighted decomposition module 108 resulting in a trained compressed model 112.

One or more example embodiments may be based on the following methodology when generating a trained compressed model (such as trained compressed model 112, for example). A given weight tensor X of a layer with significance W is decomposed into core G and factors A, B and C, resulting in a recovered tensor $R = G \times_1 A \times_2 B \times_3 C$, such that $R_i$ should be close to $X_i$ for a large significance $W_i \approx 1$ for entry i, and $R_i$ should be close to 0 for a small significance $W_i \approx 0$ for entry i. Thus, $R_i$ should be between $W_i \cdot X_i$ and $(2 - W_i) \cdot X_i$. We define a function $f_w(R, X)$ as follows:

$$f_w(R, X)|_i = \begin{cases} 0, & \text{if } R_i \text{ lies between } W_i \cdot X_i \text{ and } (2 - W_i) \cdot X_i \\ |R_i - (2 - W_i) \cdot X_i|, & \text{if } R_i \geq (2 - W_i) \cdot X_i \\ |R_i - W_i \cdot X_i|, & \text{if } R_i \leq W_i \cdot X_i \end{cases}$$

Then, the objective of the tensor decomposition is to determine G, A, B and C that minimizes some norm of $f_w(R, X)$, for example, $\|f_w(R, X)\|_F^2$ which is the square of the Frobenius norm of $f_w(R, X)$.

Figure 3:
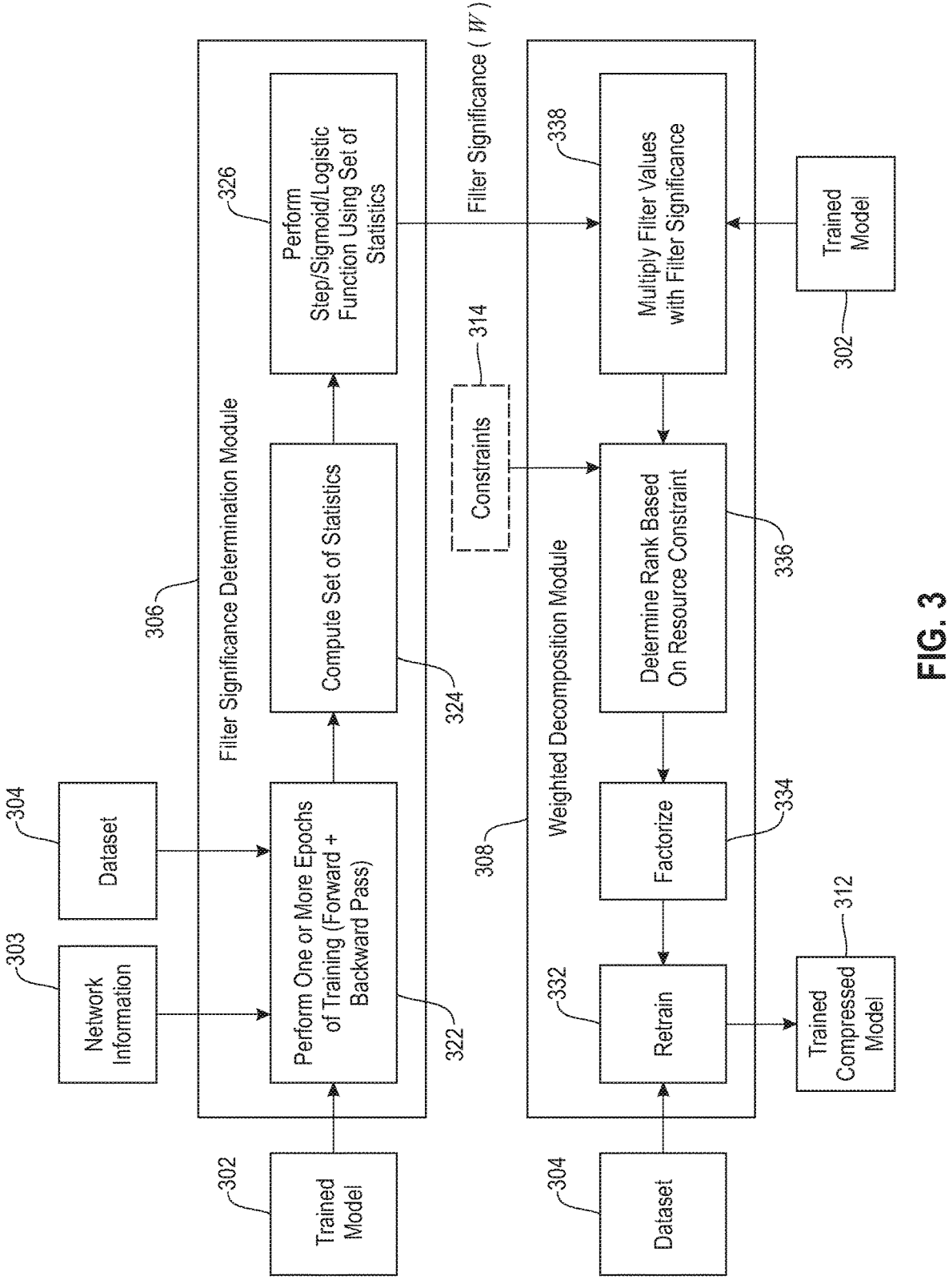
FIG. 3 is a diagram illustrating a system architecture that uses '0-1' significance for filters according to an exemplary embodiment of the invention.

FIG. 3 is a diagram of a system architecture with filters having '0-1' significance according to an exemplary embodiment of the invention. In the example shown in FIG. 3, a trained model 302, network information 303 (similar to network information 103, for example), and at least a portion of a dataset 304 are provided as input to the filter significance determination module 306. The filter significance determination module 306 performs a few epochs of training (forward and backward pass) as shown at 322, and then computes a set of statistics at 324. The set of statistics may include, for example, average activations or gradients corresponding to each filter in the trained model. At 326, the filter significance determination module 306 performs one or more of a step, sigmoid, and logistic function based on the set of statistics to determine filter significance (W) for each layer of the trained model. The filter significance values are then provided as input to the weighted decomposition module 308. The weighted decomposition module 308 multiplies the filter values with the filter significance as shown at 338 to obtain an input tensor for a given layer of the neural network. At 336, the module 308 determines a rank based at least in part on one or more resource constraints 314, and then performs a low rank factorization process as represented by 334. The low factorization process generates a resulting tensor having a rank equal to the determined rank, wherein the resulting tensor approximates the input tensor. The trained model 302 is retrained at 332 using the dataset 304 and the resulting tensor. A compressed version 312 of the trained model 302 is then output by the weighted decomposition module 308 such as, for example, to a separate device.

Figure 4:
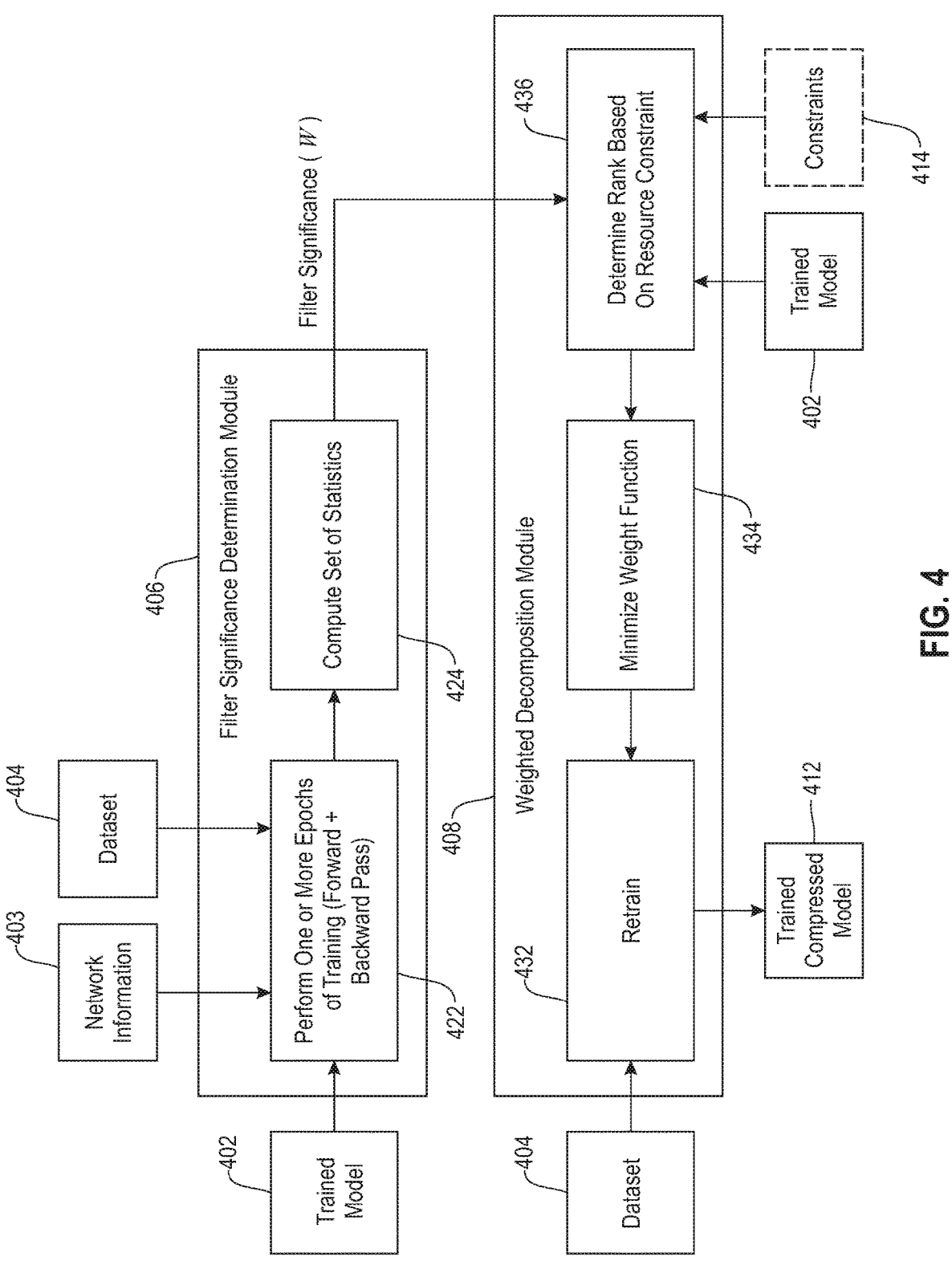
FIG. 4 is a diagram illustrating a system architecture that uses arbitrary significance for filters according to an exemplary embodiment of the invention.

FIG. 4 is a diagram of a system architecture with filters having arbitrary significance values according to an exemplary embodiment of the invention. Similar to FIG. 3, the filter significance determination module 406 obtains trained model 402, network information 403 (similar to network information 103, for example), and at least a portion of the dataset 404. The filter significance determination module 406 performs a few epochs of training (forward and backward pass) as shown at 422, and computes a set of statistics at 424 to determine filter significance (W). The filter significance determination module 406 provides the filter significance for each layer of the trained model. The weighted decomposition module 408 determines a target rank based on user constraints 414 as shown at 436. The module 408 then minimizes a weight function at 434 (e.g., $\|f_W(R, X)\|_F^2$), wherein X is the input tensor and R is a reconstructed tensor with the target rank. The trained model 402 is retrained at 432 using the dataset 404 and the reconstructed tensor. A compressed version 412 of the trained model 402 is then output in a similar manner as described in FIG. 3, for example.

FIG. 5 is a flow diagram of a process 500 according to an embodiment of the present invention. Step 502 includes obtaining a target dataset and a trained model of a neural network. Step 504 includes providing at least a portion of the target dataset to the trained model. Step 506 includes determining relevance of each of one or more of filters of the neural network and channels of the neural network to the target dataset based on the provided portion, wherein the one or more of the filters and the channels correspond to at least one layer of the neural network. Step 508 includes compressing the trained model of the neural network based at least in part on the determined relevancies. Step 510 includes outputting the compressed trained model.

The determining may include performing a predetermined number of epochs of training using the portion of the target dataset; and computing statistics based on activations of the one or more filters and channels during the training. The target dataset may include a plurality of images, and determining the relevance of each of the one or more of the filters and the channels may include determining which of the one or more of the filters and the channels are activated for one or more of (i) all of the images of the dataset, (ii) images of a particular class of interest, (iii) images of a class with a number of training samples that is below a threshold, and (iv) a particular layer of the neural network. The process 500 may include using the determined relevancies of the one or more of the filters and the channels to adjust at least one weight tensor of the trained model, wherein the at least one weight tensor comprises weights for the one or more of the filters and the channels of the at least one layer. The compressing may include: applying a weighted low rank factorization process to the adjusted at least one tensor to generate at least one resulting tensor that approximates the at least one weight tensor of the trained model, wherein a target rank of the at least one resulting tensor is smaller than a rank of the at least one weight tensor of the trained model. Configuring the target rank of the at least one resulting tensor may be based at least in part on a higher order singular value decomposition technique. The weighted low rank factorization process may include minimizing a weight function defined as total deviation across tensor elements of the adjusted at least one weight tensor and tensor elements of the resulting at least one tensor. The tensor elements of the at least one resulting tensor may directly depend on the determined relevance of the one or more of the filters and the channels such that filters and/or channels that are determined to be more relevant to the target dataset are retained in the at least one resulting tensor. The process 500 may include configuring the target rank based at least in part on one or more constraints corresponding to one or more of (i) processing requirements and (ii) memory requirements of the compressed trained model. The compressing may include applying one or more of a gradient descent and a conjugate gradient technique, thereby reducing a measure of the weighted error of the at least one weighted tensor and the at least one resulting tensor. The measure of the weighted error may include a Frobenius norm. The weighted low rank factorization process may include at least one of: a Tucker Decomposition and a CANDECOMP/PARAFAC Decomposition process. The trained model may include a compressed model generated based on one or more of: (i) a weight-based pruning process; (ii) a quantization and/or weight sharing process; (iii) a relative indexing process; and (iv) an encoding process. The process 500 may include retraining the compressed trained model with the target dataset. The process 500 may include outputting the trained model, from the at least one computing device to at least one separate computing device, wherein the at least one separate computing device has one or more of (i) limited processing capabilities and (ii) memory capabilities relative to the at least one computing device.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

According to another embodiment of the subject matter described herein, a method includes obtaining a trained model of a convolutional neural network and a dataset on which the model was trained; analyzing the trained model to determine inherent redundancies and relevancies of parts of one or more layers of the convolutional neural network and the dataset, at least in part by performing one or more epochs of training of the trained model on the dataset, wherein the parts of the one or more layers comprise at least one of filters and channels; and compressing the trained model based on the determined inherent redundancies and the relevancies.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 6:
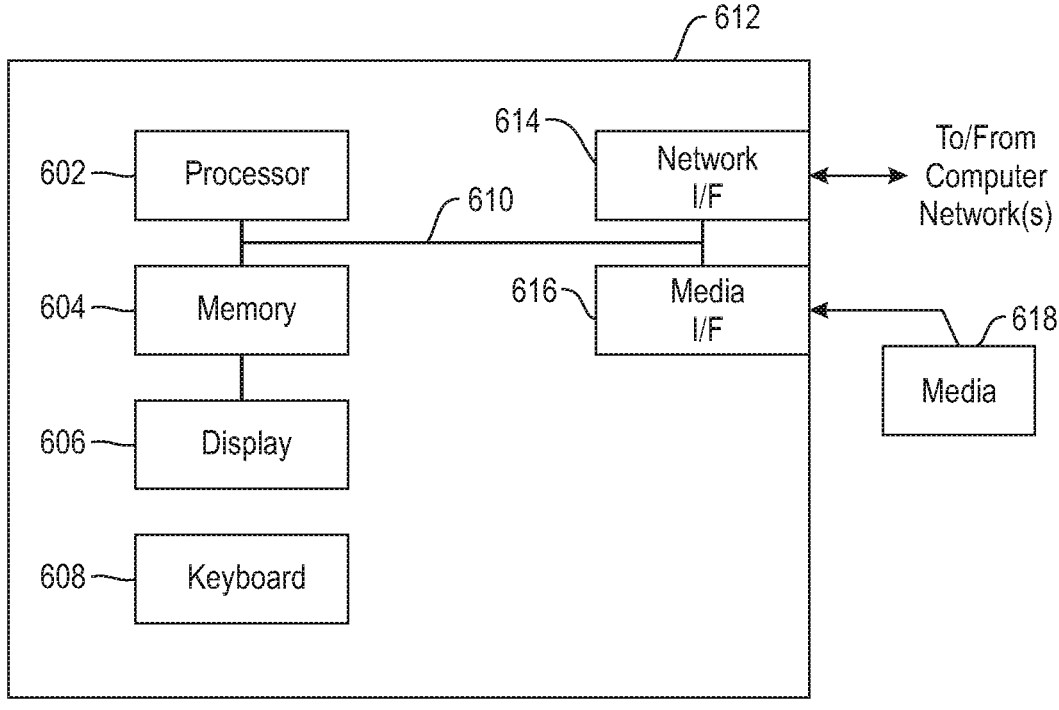
FIG. 6 is a system diagram of an exemplary computer system on which at least one embodiment of the invention can be implemented.

Additionally, an embodiment of the present invention can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
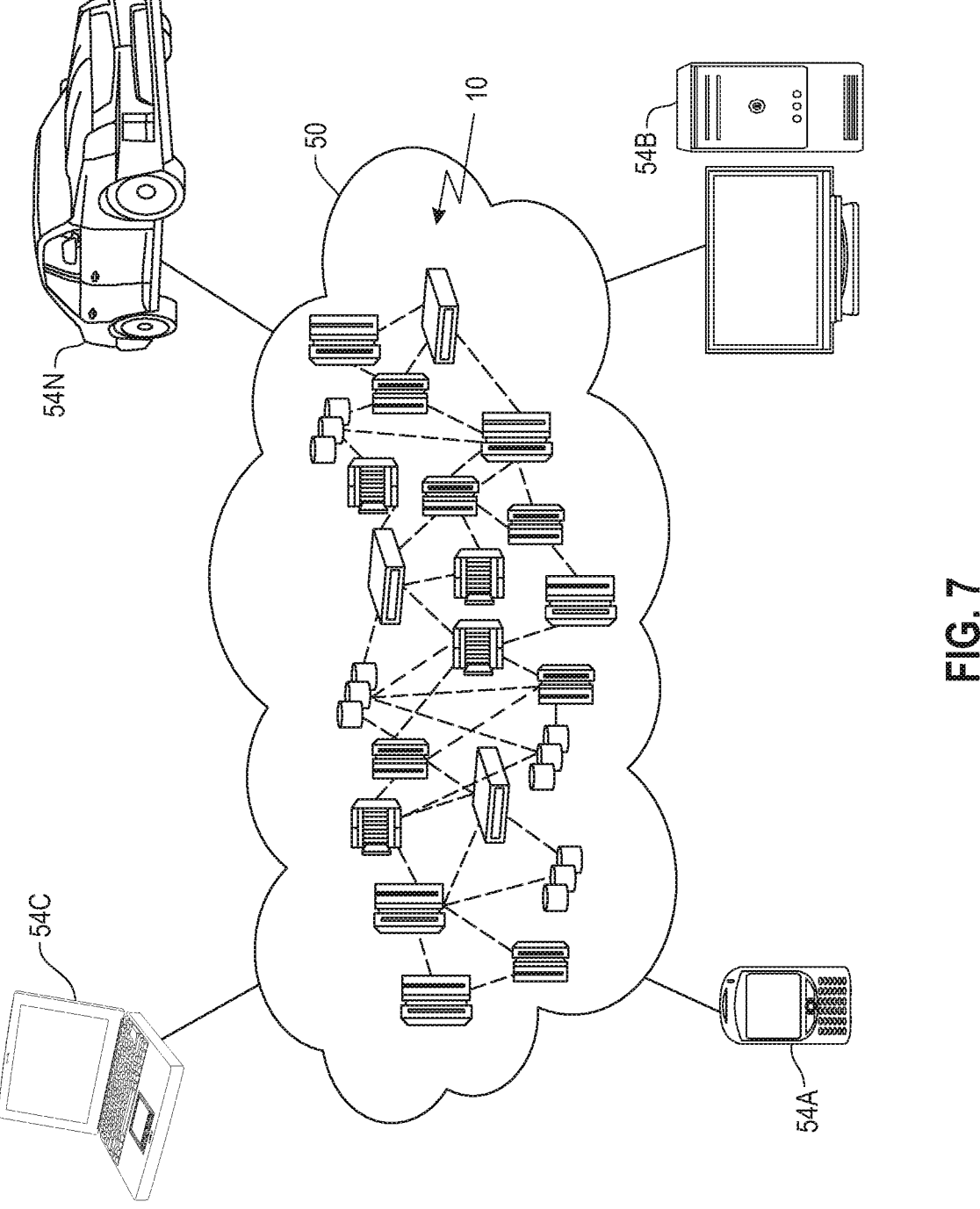
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
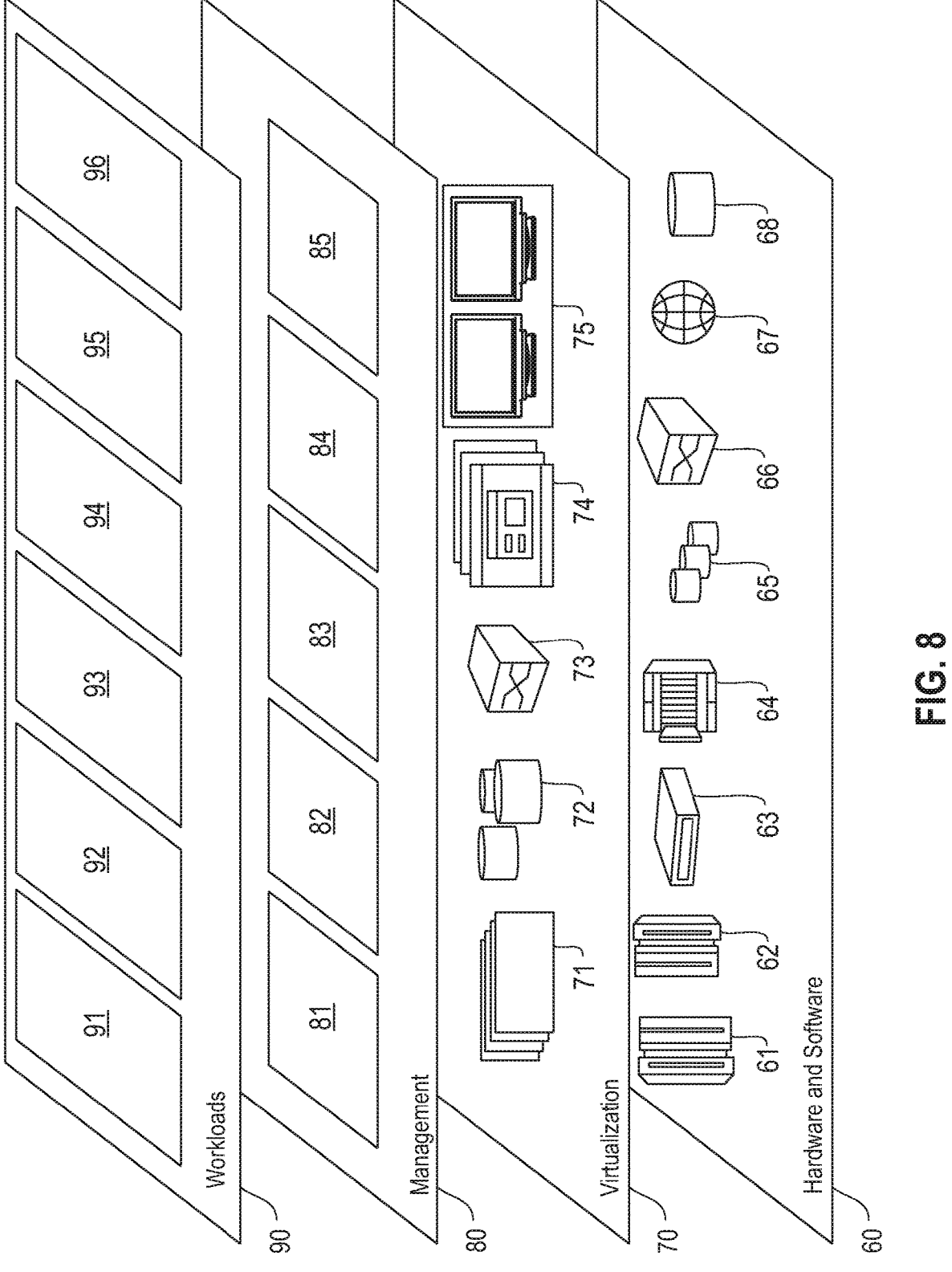
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dataset dependent low rank decomposition of neural networks 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

Figures 9A, 9B:
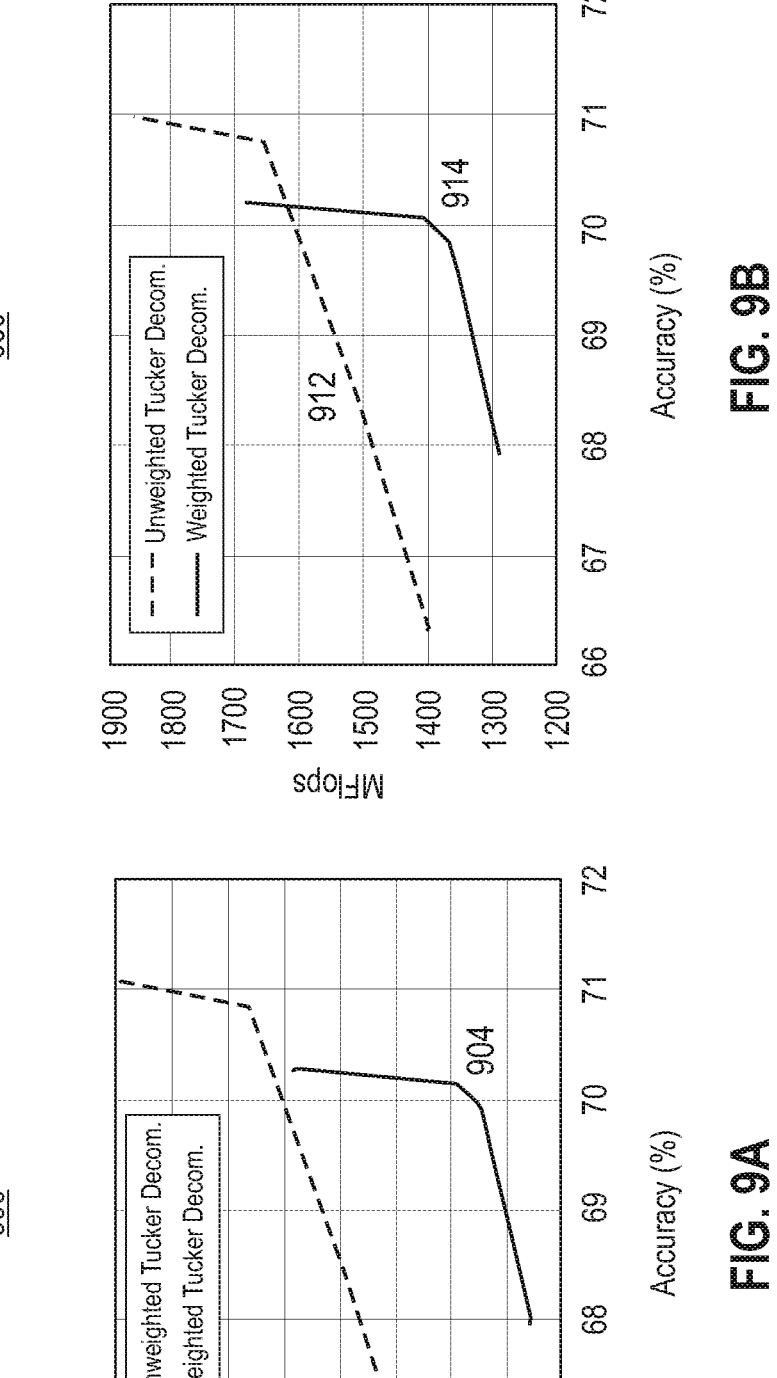
FIGS. 9A-9B show graphs comparing computing resources for a weighted decomposition technique and an unweighted decomposition technique.

At least one embodiment of the present invention may provide a beneficial effect such as, for example, reducing size and/or flops of neural networks compared to existing compression techniques. One or more embodiments of the present invention may also provide a beneficial effect such as, for example, allowing deep learning models with a greater number of layers and parameter to be used on device with limited resources (such as mobile phones and other edge devices in the context of IOT, for example). FIG. 9A is a graph 900 showing accuracy percentage versus model size (in MB) for a conventional compression technique (unweighted tucker decomposition 902) and a compression technique in accordance with an example embodiment of the subject matter described herein (weighted tucker decomposition 904). As can be seen from graph 900, the weighted Tucker Decomposition technique provides a smaller model size with only a small drop off in accuracy. Similarly, FIG. 9B shows a graph 950 showing the weighted Tucker Decomposition technique 912 requires less flops than the unweighted compression technique 914 while maintaining similar accuracy.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

providing a portion of a first dataset to a trained model of a neural network trained on a second dataset that is different than the first dataset, wherein the first dataset comprises a plurality of training samples for a set of classes, and wherein the portion of the first dataset comprises at least one of: (i) a designated number of training samples from two or more classes in the set of classes; and (ii) all training samples in a subset of the set of classes;

determining a non-binary relevance value for each of one or more of filters of the neural network and channels of the neural network to the first dataset based on the provided portion, wherein the one or more of the filters and the channels correspond to at least one layer of the neural network, and wherein the determining is based on statistics computed for a particular number of epochs of training using the portion of the first dataset;

adjusting at least one first weight tensor corresponding to the at least one layer of the neural network, wherein the at least one first weight tensor comprises weights for the one or more of the filters and the channels of the at least one layer, and wherein the adjusting comprises element-wise scaling of the weights in the at least one first weight tensor by the determined non-binary relevance value for each of the one or more of the filters and the channels;

generating at least one second weight tensor by performing a weighted low rank factorization process that approximates the scaled weights of the adjusted at least one first weight tensor, wherein a rank of the at least one second weight tensor is smaller than a rank of the at least one first weight tensor, and wherein the weighted low rank factorization process comprises reducing a weighted error measure corresponding to a total deviation across corresponding tensor elements of the adjusted at least one first weight tensor and tensor elements of the at least one second weight tensor;

using the at least one second weight tensor to compress the trained model of the neural network by replacing, for the at least one layer, the at least one first weight tensor with the at least one second weight tensor; and retraining the compressed trained model with the first dataset;

wherein the method is carried out by at least one computing device.

2. The computer-implemented method of claim 1, wherein the determining comprises:

performing the particular number of epochs of the training using the portion of the first dataset; and computing the statistics based on activations of the one or more of the filters and the channels during the training.

3. The computer-implemented method of claim 1, wherein the first dataset comprises a plurality of images, and wherein the determining comprises:

determining which of the one or more of the filters and the channels are activated for one or more of: all of the plurality of images of the first dataset; images of a particular class of interest; images of a class with a number of training samples that is below a threshold; and a particular layer of the neural network.

4. The computer-implemented method of claim 1, wherein the rank of the at least one second weight tensor is determined using a higher order singular value decomposition process.

5. The computer-implemented method of claim 1, wherein the tensor elements of the at least one second weight tensor depend on the determined non-binary relevance value for each of the one or more of the filters and the channels such that one or more of the filters and the channels that are determined to be more relevant to the first dataset are retained in the at least one second weight tensor.

6. The computer-implemented method of claim 1, comprising:

configuring the rank of the at least one second weight tensor based at least in part on one or more constraints corresponding to one or more of processing requirements and memory requirements of the compressed trained model.

7. The computer-implemented method of claim 1, wherein the reducing of the weighted error measure comprises applying one or more of a gradient descent process and a conjugate gradient process, and wherein the weighted error measure comprises a matrix norm.

8. The computer-implemented method of claim 1, wherein the trained model comprises a compressed model generated based on one or more of: a weight-based pruning process; at least one of a quantization and a weight sharing process; a relative indexing process; and an encoding process, and wherein the trained model is further compressed using the at least one second weight tensor.

9. The computer-implemented method of claim 1, comprising:

outputting the trained model, from the at least one computing device to at least one separate computing device, wherein the at least one separate computing device has one or more of limited processing capabilities and memory capabilities relative to the at least one computing device.

10. The computer-implemented method of claim 1, wherein the rank of the at least one second weight tensor is configured to control an amount of compression applied to the trained model.

11. The computer-implemented method of claim 2, wherein a particular non-binary relevance value of a given one of the one or more of the filters is determined by performing one or more of a step function, a sigmoid function, and a logistic function based on the statistics.

12. The computer-implemented method of claim 1, wherein the generated at least one second weight tensor approximates all of the scaled weights of the adjusted at least one first weight tensor.

13. The computer-implemented method of claim 1, wherein the weighted low rank factorization process comprises a Tucker Decomposition process, and wherein the weighted error measure comprises a Frobenius norm.

14. A computer program product comprising a non-transitory computer readable storage medium having program instructions embodied therewith, the program instructions executable by a computing device to cause the computing device to:

provide a portion of a first dataset to a trained model of a neural network trained on a second dataset that is different than the first dataset, wherein the first dataset comprises a plurality of training samples for a set of classes, and wherein the portion of the first dataset comprises at least one of: (i) a designated number of training samples from two or more classes in the set of classes; and (ii) all training samples in a subset of the set of classes;

determine a non-binary relevance value for each of one or more of filters of the neural network and channels of the neural network to the first dataset based on the provided portion, wherein the one or more of the filters and the channels correspond to at least one layer of the neural network, and wherein the determining is based on statistics computed for a particular number of epochs of training using the portion of the first dataset;

adjust at least one first weight tensor corresponding to the at least one layer of the neural network, wherein the at least one first weight tensor comprises weights for the one or more of the filters and the channels of the at least one layer, and wherein the adjusting comprises element-wise scaling of the weights in the at least one first weight tensor by the determined non-binary relevance value for each of the one or more of the filters and the channels;

generate at least one second weight tensor by performing a weighted low rank factorization process that approximates the scaled weights of the adjusted at least one first weight tensor, wherein a rank of the at least one second weight tensor is smaller than a rank of the at least one first weight tensor, and wherein the weighted low rank factorization process comprises reducing a weighted error measure corresponding to a total deviation across corresponding tensor elements of the adjusted at least one first weight tensor and tensor elements of the at least one second weight tensor;

use the at least one second weight tensor to compress the trained model of the neural network by replacing, for the at least one layer, the at least one first weight tensor with the at least one second weight tensor; and retrain the compressed trained model with the first dataset.

15. The computer program product of claim 14, wherein the determining comprises:

performing the particular number of epochs of the training using the portion of the first dataset; and computing the statistics based on activations of the one or more of the filters and the channels during the training.

16. The computer program product of claim 14, wherein the first dataset comprises a plurality of images, and wherein the determining comprises:

determining which of the one or more of the filters and the channels are activated for one or more of: all of the plurality of images of the first dataset; images of a particular class of interest; images of a class with a number of training samples that is below a threshold; and a particular layer of the neural network.

17. The computer program product of claim 14, wherein the weighted low rank factorization process comprises a Tucker Decomposition process, and wherein the weighted error measure comprises a Frobenius norm.

18. A system comprising:

a memory; and at least one processor operably coupled to the memory and configured to:

provide a portion of a first dataset to a trained model of a neural network trained on a second dataset that is different than the first dataset, wherein the first dataset comprises a plurality of training samples for a set of classes, and wherein the portion of the first dataset comprises at least one of: (i) a designated number of training samples from two or more classes in the set of classes; and (ii) all training samples in a subset of the set of classes;

determine a non-binary relevance value for each of one or more of filters of the neural network and channels of the neural network to the first dataset based on the provided portion, wherein the one or more of the filters and the channels correspond to at least one layer of the neural network, and wherein the determining is based on statistics computed for a particular number of epochs of training using the portion of the first dataset;

adjust at least one first weight tensor corresponding to the at least one layer of the neural network, wherein the at least one first weight tensor comprises weights for the one or more of the filters and the channels of the at least one layer, and wherein the adjusting comprises element-wise scaling of the weights in the at least one first weight tensor by the determined non-binary relevance value for each of the one or more of the filters and the channels;

generate at least one second weight tensor by performing a weighted low rank factorization process that approximates the scaled weights of the adjusted at least one first weight tensor, wherein a rank of the at least one second weight tensor is smaller than a rank of the at least one first weight tensor, and wherein the weighted low rank factorization process comprises reducing a weighted error measure corresponding to a total deviation across corresponding tensor elements of the adjusted at least one first weight tensor and tensor elements of the at least one second weight tensor;

use the at least one second weight tensor to compress the trained model of the neural network by replacing, for the at least one layer, the at least one first weight tensor with the at least one second weight tensor; and retrain the compressed trained model with the first dataset.

19. The system of claim 18, wherein the weighted low rank factorization process comprises a Tucker Decomposition process, and wherein the weighted error measure comprises a Frobenius norm.

20. A computer-implemented method, the method comprising: providing a portion of a first dataset to a trained model of a convolutional neural network trained on a second dataset that is different than the first dataset, wherein the first dataset comprises a plurality of training samples for a set of classes, and wherein the portion of the first dataset comprises at least one of: (i) a designated number of training samples from two or more classes in the set of classes; and (ii) all training samples in a subset of the set of classes;

determining inherent redundancies of the trained model and a non-binary relevance value for each of one or more of filters of the convolutional neural network and channels of the convolutional neural network to the first dataset based on the provided portion, wherein the one or more of the filters and the channels correspond to at least one layer of the convolutional neural network, and wherein the determining is based on statistics computed for a particular number of epochs of training using the portion of the first dataset;

adjusting at least one first weight tensor corresponding to the at least one layer of the convolutional neural network based at least in part on the determined inherent redundancies, wherein the at least one first weight tensor comprises weights for the one or more of the filters and the channels of the at least one layer, and wherein the adjusting comprises element-wise scaling of the weights in the at least one first weight tensor by the determined non-binary relevance value for each of the one or more of the filters and the channels;

generating at least one second weight tensor by performing a weighted low rank factorization process that approximates the scaled weights of the adjusted at least one first weight tensor, wherein a rank of the at least one second weight tensor is smaller than a rank of the at least one first weight tensor, and wherein the weighted low rank factorization process comprises reducing a weighted error measure corresponding to a total deviation across corresponding tensor elements of the adjusted at least one first weight tensor and tensor elements of the at least one second weight tensor;

using the at least one second weight tensor to compress the trained model of the convolutional neural network by replacing, for the at least one layer, the at least one first weight tensor with the at least one second weight tensor; and retraining the compressed trained model with the first dataset;

wherein the method is carried out by at least one computing device.

* * * * *